United States Patent [19]

Gonos et al.

Best Available Copy

[11] E Re. 30,075

[45] Reissued Aug. 21, 1979

[54] METHOD AND APPARATUS FOR LOCATING IMPROPERLY POSITIONED OR BENT ROLLS

[75] Inventors: Michael G. Gonos, Monroeville Borough; Kenneth D. Ives, Plum Borough; Ronald S. Vranka, Monroeville Borough, all of Pa.

[73] Assignee: United States Steel Corporation, Pittsburgh, Pa.

[21] Appl. No.: 690,743

[22] Filed: May 27, 1976

Related U.S. Patent Documents

Reissue of:

[64] Patent No.: 3,939,568
Issued: Feb. 24, 1976
Appl. No.: 503,147
Filed: Sep. 4, 1974

[51] Int. Cl.[2] ..... G01B 5/00

[52] U.S. Cl. ..... 33/143 L; 33/147 K; 33/178 F

[58] Field of Search ..... 164/4, 150, 154; 33/182, 143 L, 143 K, 174 L, DIG. 5, 147 K, 147 L, 147 M, 178 F

[56] References Cited

U.S. PATENT DOCUMENTS 2,616,183 11/1952 Roberts ..... 33/178 E
3,496,644 2/1970 Short ..... 33/304
3,937,271 2/1976 Akiba et al. ..... 33/174 L

FOREIGN PATENT DOCUMENTS 512091 8/1939 United Kingdom ..... 33/178 E

*Primary Examiner*—Harry N. Haroian
*Attorney, Agent, or Firm*—Walter P. Wood

[57] ABSTRACT

A method and apparatus for locating improperly positioned or bent rolls among a set of rolls which define a confined path of travel for a workpiece, particularly useful for checking a straight or curved roll-rack of a continuous-casting machine. The apparatus may be propelled through the path defined by the rolls by any suitable mechanism. For example, as applied to a roll-rack, the apparatus may be attached to the upper end of a starter bar and propelled with the bar through the rack, or the apparatus may be suspended from a hoist and pulled through the rack. The apparatus includes a housing and means within the housing for measuring the gap between work-engaging faces of the rolls and-or, when used with a curved roll-rack, means for measuring the angular relation of adjacent bottom rolls. The latter measurement is used in determining whether the work-engaging faces lie on arcs of the intended radii. Bent rolls are located by observing different measurements when the apparatus is moved in opposite directions through the path of travel.

31 Claims, 8 Drawing Figures

FIG. 7.
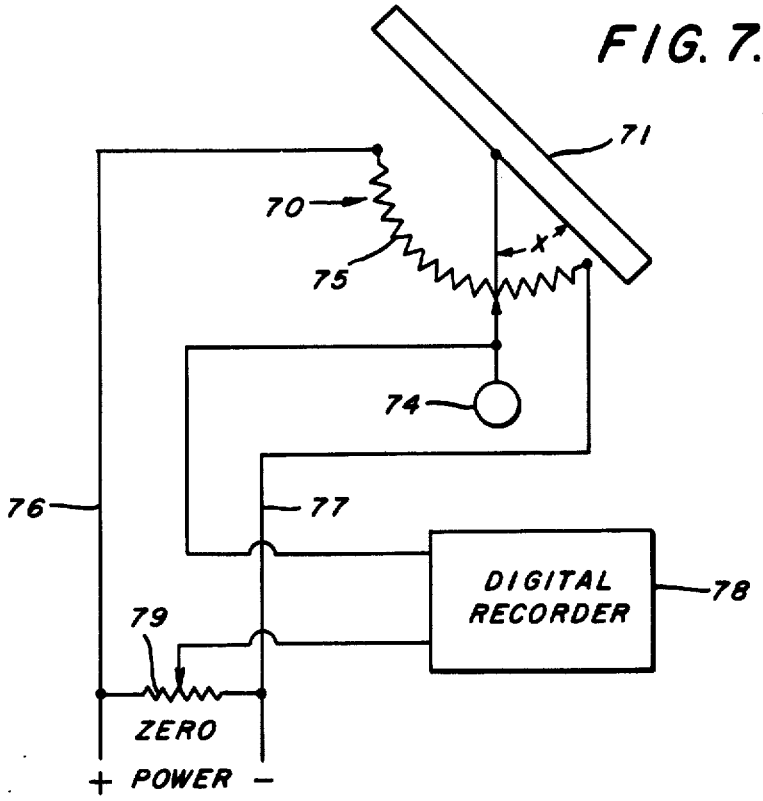
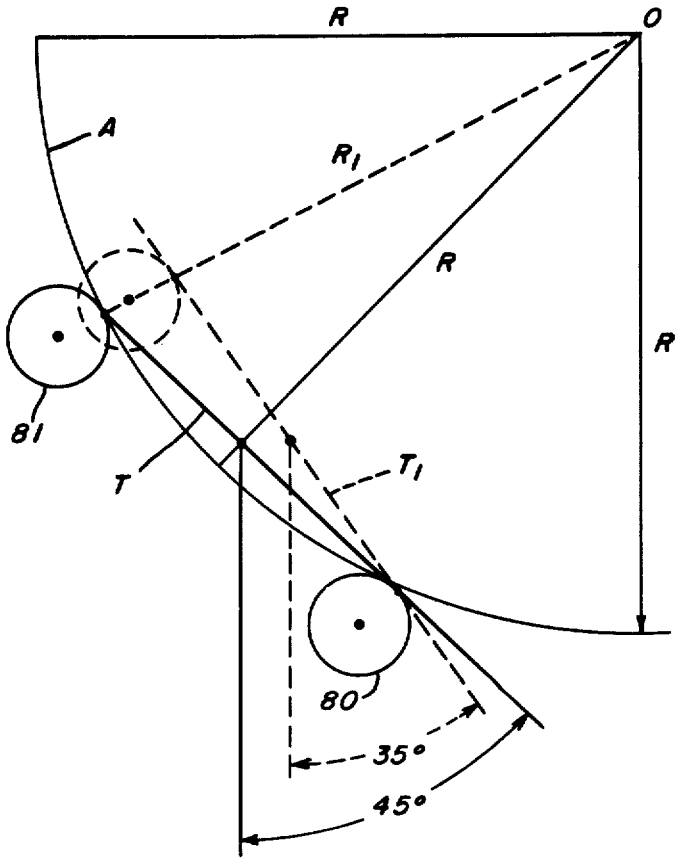
FIG. 8.

METHOD AND APPARATUS FOR LOCATING IMPROPERLY POSITIONED OR BENT ROLLS

Matter enclosed in heavy brackets [ ] appears in the original patent but forms no part of this reissue specification; matter printed in italics indicates the additions made by reissue.

This invention relates to an improved method and apparatus for locating improperly positioned or bent rolls among a set of rolls which define a confined path of travel for a workpiece. In referring to rolls as "improperly positioned," we mean that the gap between the work-engaging faces of two rolls of an opposed pair may not be of the proper dimension, or that the work-engaging faces may not lie on an intended arc.

Although our invention is not thus limited, our method and apparatus are particularly useful for locating improperly positioned or bent rolls in a roll-rack of a continuous-casting machine. A conventional curved or straight roll-rack includes a frame and a plurality of opposed pairs of rolls journaled in the frame for guiding and confining a casting as its core continues to solidify. A curved roll-rack includes top and bottom rolls which guide a casting as its direction of travel changes from substantially vertical to horizontal. A curved roll-rack usually defines an arcuate path of travel of a radius of at least about 30 feet. The gap between the work-engaging faces of the roll-pairs depends on the thickness of the casting, but seldom is less than about 6 inches. Consequently a curved roll-rack is a massive mechanism, yet it is important that its rolls all are straight and positioned accurately. The work-engaging faces of the top and bottom rolls of each pair should lie accurately on two predetermined arcs. In either a straight or curved roll-rack the gaps between the work-engaging faces of each roll-pair should be equal within small tolerances. Any rolls which are bent or not positioned properly may either become overloaded and hence subject to early failure, or else they do not effectively confine the casting.

In most continuous-casting installations the gaps between roll faces are measured manually and the rolls are adjusted with shims only while the casting machine is down for scheduled maintenance, ideally about one turn a week. Measuring and adjusting the roll gaps manually are awkward operations, often done inaccurately. An improperly gapped roll-pair may go unnoticed until the next scheduled maintenance unless an actual failure occurs. As far as we are aware, there has been no satisfactory way of locating bent rolls nor of determining whether or not the work-engaging faces of a curved roll-rack lie accurately on arcs of the intended radii.

An object of our invention is to provide an improved method and apparatus, particularly useful for continuous-casting machines, for expeditiously checking or determining whether rolls which define a confined path of travel for a workpiece are positioned properly and for locating any improperly positioned or bent rolls.

A further object is to provide an improved method and apparatus which, as applied to a curved roll-rack, enable us both to measure the gaps between the work-engaging faces of the roll-pairs and to determine whether these faces lie on arcs of the intended radii, or to perform either operation independently of the other.

A further object is to provide an improved method and apparatus for accomplishing the foregoing objects, the apparatus of which includes a housing movable through the path defined by the work-engaging faces of the roll-pairs, said housing carrying gap sensors and/or angle sensors for contacting the individual rolls and means for transmitting signals indicative of the gap measurements and/or angle measurements.

A more specific object is to provide an improved method and apparatus for accomplishing the last-named object in which the housing can be mounted on the starter bar of a continuous-casting machine and propelled with the starter bar along the path defined by the work-engaging faces of the roll-pairs of a roll-rack.

A further object is to provide an improved method and apparatus for locating bent rolls, as well as improperly positioned rolls, in which bent rolls are indicated when the gap measurements differ as the apparatus moves in opposite directions through the path defined by the rolls, or when the gap between the work-engaging faces of a roll-pair varies significantly along the length of the rolls.

In the drawings:

FIG. 7 is a simplified wiring diagram of the circuit embodies in our apparatus for measuring the angles of lines tangent to the work-engaging faces of the rolls and thereby determining whether these faces lie on arcs of the intended radii; and FIG. 8 is an exaggerated diagram illustrating the geometric principles involved in using the angle measurement to check the radius of an arc.

EXAMPLE OF CONTINUOUS-CASTING MACHINE

The principles of our invention may be applied generally for locating improperly positioned or bent rolls among a set of rolls which define a confined path of travel for a workpiece. For illustrative purposes only, we shown our invention used with a curved roll-rack of a continuous-casting machine. The continuous-casting machine illustrated is constructed as shown in Bode and Wrhen U.S. Pat. No. 3,735,848 and in Gallucci and Slamar U.S. Pat. No. 3,752,210, both of common ownership.

Figure 1:
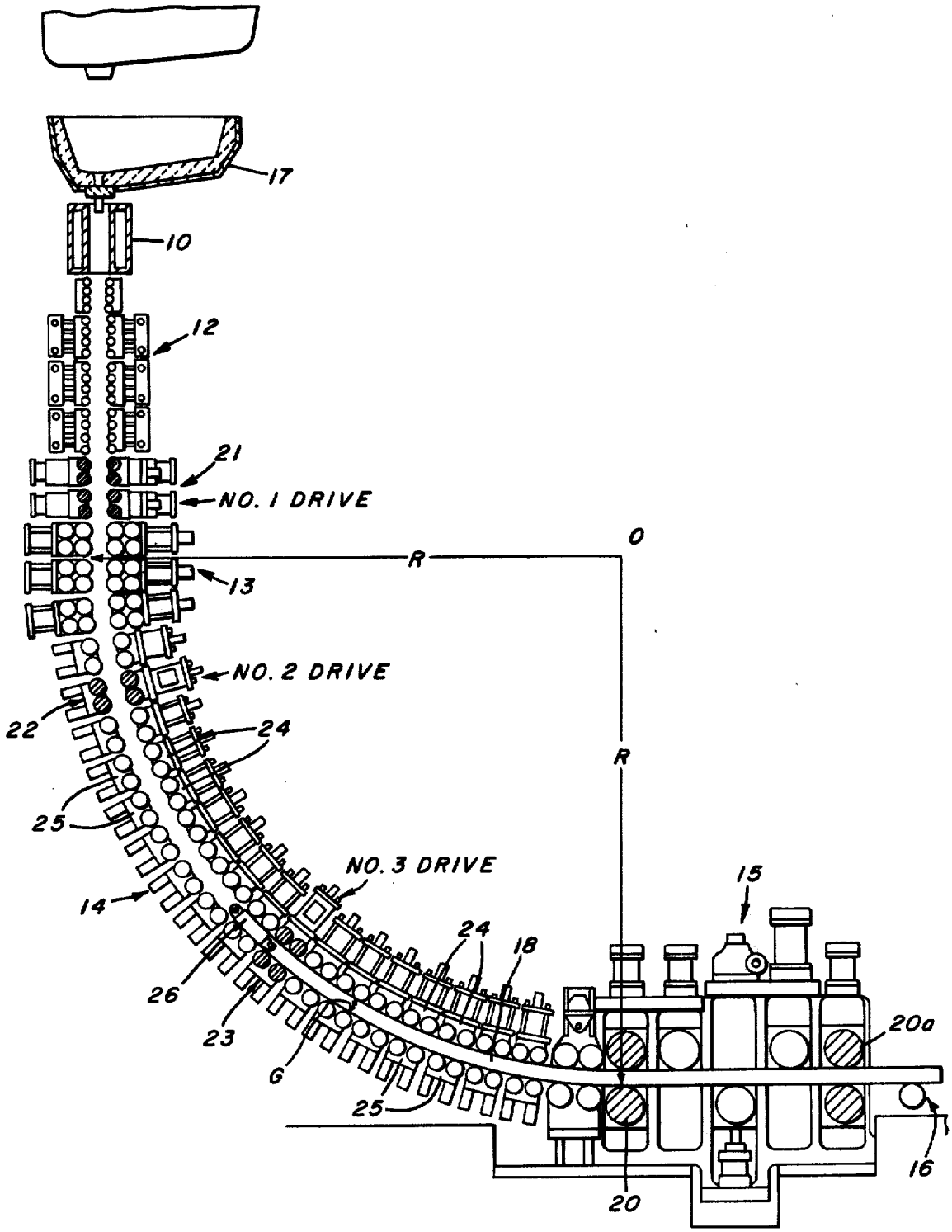
FIG. 1 is a diagrammatic side elevational view of an illustrative form of continuous-casting machine with our apparatus installed therein.

As shown in FIG. 1, the casting machine illustrated comprises an open-ended, water-cooled, vertically oscillating mold 10, a guide roll-rack 12, a bending-roll unit 13, a curved roll-rack 14, a straightener 15, and a run-out conveyor 16. Liquid metal is poured from a tundish 17 into the mold, and a partially solidified casting (not shown) emerges continuously from the bottom of the mold and travels successively through the other aforementioned components. The machine is equipped with a flexible starter bar 18. The casting and starter bar are propelled by speed-regulating drive rolls 20 and 20a in the straightener, and by power driven pinch rolls in Nos. 1, 2 and 3 auxiliary drives 21, 22 and 23 respectively, which are located at spaced levels between the guide roll-rack 12 and the straightener 15 and are reversible. The other rolls are idlers.

The rolls of the bending-roll unit 13, the curved roll-rack 14 and auxiliary drives 21, 22 and 23 are arranged in top and bottom clusters 24 and 25 of two rolls per cluster. Reference may be made to the aforementioned Bode and Wrhen patent for a detailed showing of the cluster construction. The work-engaging faces of the rolls of the bottom clusters 25 are intended to lie on a circular arc, the center of curvature of which is indicated at O and the constant radius at R. The gap between the work-engaging faces of the top and bottom roll-pairs is indicated at G. Again for purposes of illustration only, we assume that the radius R is 30 feet, the gap G is 7.25 inches, all rolls of the curved roll-rack are 12 inches in diameter, and the length of the chord between the axes of two adjacent rolls in the bottom clusters is 14 inches. The length of the chord between the work-engaging faces of the same rolls of course is a fraction of an inch smaller.

CONSTRUCTION OF APPARATUS

Figure 3:
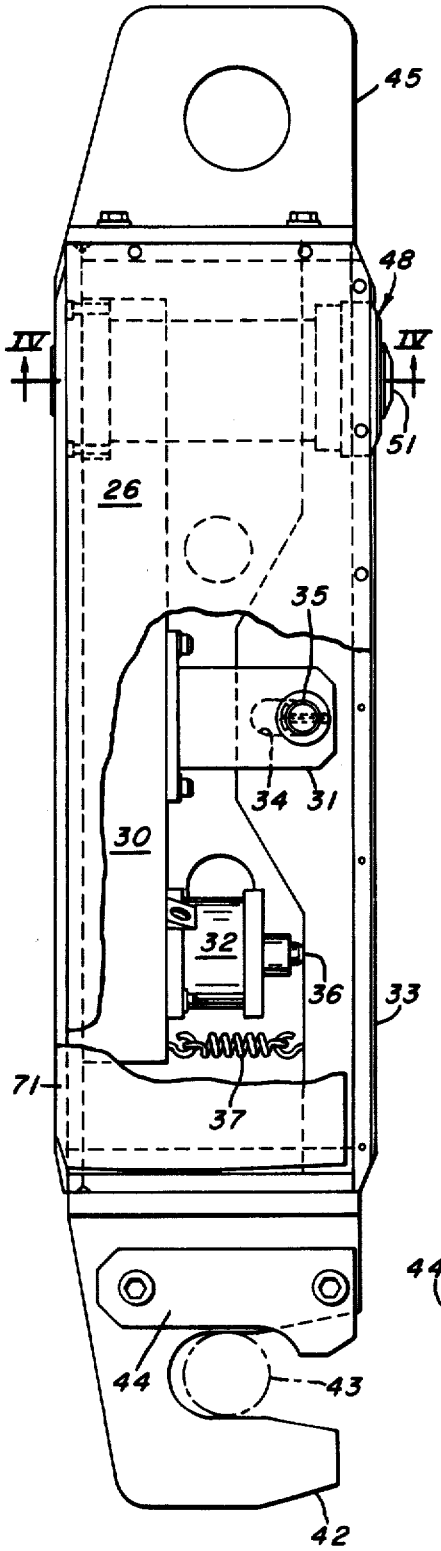
FIG. 3 is a side elevational view of our apparatus with parts broken away.
Figure 2:
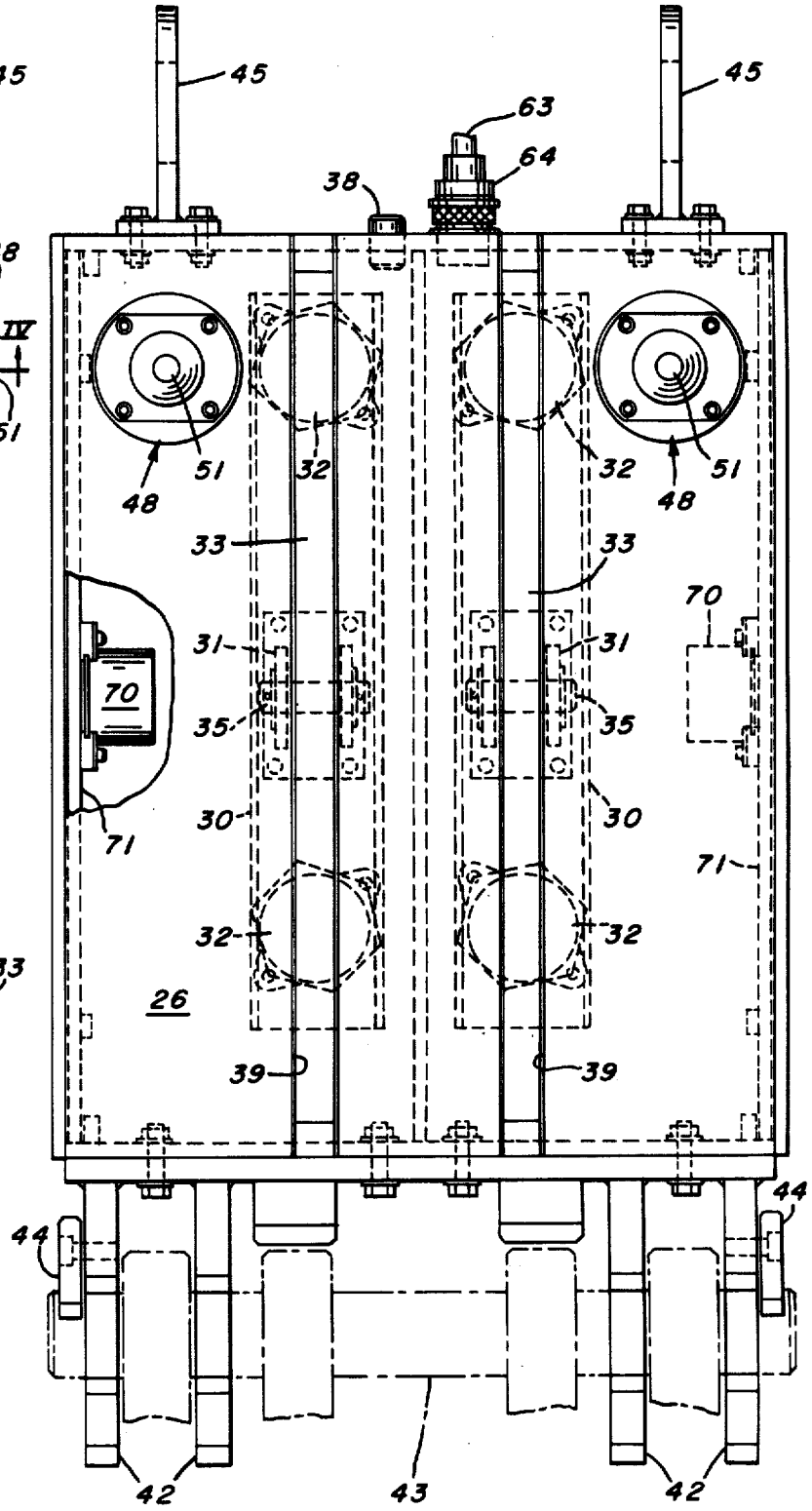
FIG. 2 is a front elevational view of our apparatus with parts broken away.

As shown in FIGS. 2 and 3, our apparatus for locating improperly positioned or bent rolls comprises a housing 26 formed of metal plates and shaped essentially as a rectangular parallelepiped. The housing carries a pair of straight parallel smooth-faced relatively fixed runners 27 projecting from the outside face of its back wall. The housing contains a pair of base members 30 fixed to the inside face of its back wall. Each base member carries a respective pair of pivot ears 31 fixed to its mid-portion, and a respective pair of fluid-pressure cylinders 32 fixed to its opposite end portions. Respective straight parallel smooth-faced extensible runners 33 are carried by each pair of pivot ears. Runners 33 have slots 34 which receive pins 35 mounted in the ears, whereby the runners can pivot or move in-and-out with respect to the ears. Cylinders 32 have buttons 36 which engage runners 33 and urge the runners outwardly with respect to the housing. Tension springs 37 are connected between the end portions of runners 33 and base members 30 to hold the runners in contact with buttons 36. Suitable connections 38 are mounted on the upper end wall of housing 26 for introducing fluid to cylinders 32. The front wall of the housing has a pair of slots 39 through which runners 33 project.

The lower end wall of housing 26 carries a plurality of downwardly projecting hooks 42 adapted to engage a rung 43 at the top of the starter bar 18. This is the rung which, at the beginning of a casting operation, is used for attaching a chill plate to the starter bar. Preferably lock plates 44 are removably bolted to hooks 42 to prevent unintended disengagement of the hooks from the rung, but to allow limited freedom of movement. The upper end of housing 26 carries a pair of lifting eyes 45.

When we use the apparatus with a continuous-casting machine of the construction shown in FIG. 1, we connect the housing 26 to the top of the starter bar 18. We operate the various driven rolls of the casting machine to move the housing through the path of travel defined by the rolls of both the curved roll-rack 14 and the straight guide roll-rack 12, first upwardly and then downwardly, to check the roll positions. The fixed runners 27 abut the work-engaging faces of the bottom rolls of the curved roll-rack and of the rolls at the left of the guide roll-rack, while the extensible runners 33 are urged into abutting relation with the work-engaging faces of the top rolls and of the rolls at the right. The runners serve to guide the housing as it moves along the path defined by the rolls. The straight lengths of the runners are sufficiently short that, as the housing moves through the curved roll-rack, the runners cannot abut simultaneously the work-engaging faces of more than two top rolls and two bottom rolls. In the present example this length is about 23 inches. Hence whenever the runners abut two rolls each of the curved roll-rack, they lie on the chord of the arc on which the work-engaging faces of the rolls lie.

GAP MEASUREMENT

Figure 4:
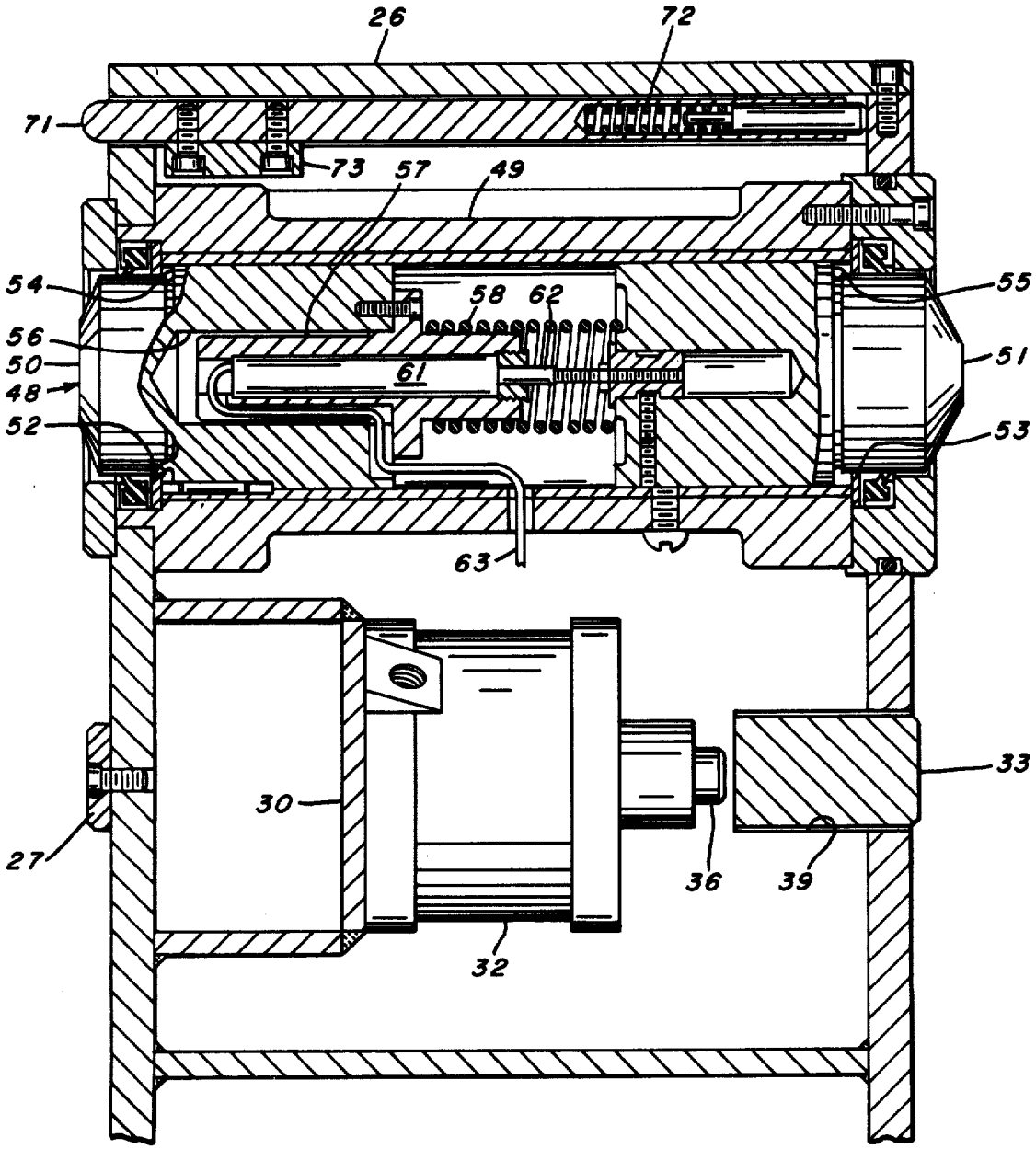
FIG. 4 is a horizontal section on a larger scale on line IV—IV of FIG. 3.

As best shown in FIGS. 2 and 4, the housing 26 contains a pair of gap sensors 48 located near its upper end near its respective side walls for measuring the gap near each end of each roll pair. We may include more than two gap sensors if we wish to measure gaps at other locations along the length of the rolls, for example at the mid-points. The gap sensors are all of like construction; hence we describe only one. The gap sensor 48 includes a tube 49 which is fixed to housing 26 and extends across its width. Back and front heads 50 and 51 are mounted within tube 48 for relative movement axially of the tube or normal to the direction of travel through path defined by the rolls. The tube has fixed stops 52 and 53 near its opposite ends for engagement by shoulders 54 and 55 on the heads 50 and 51 respectively to limit outward movement of the heads. The back head 50 has a bore 56 within which we mount a tubular fixture 57. A compression spring 58 encircles the fixture 57 and bears thereagainst and against the front head 51 to urge the two heads apart to the extent permitted by the stops 52 and 53. In their fully extended positions the heads 50 and 51 project slightly beyond the respective fixed and yieldable runners 27 and 33.

A transducer 61 is mounted within the bore of the fixture 57. A cooperating wiper 62 is mounted on the end of the front head 51 and extends into the transducer. The transducer and wiper per se are known items available commercially; hence we have not shown nor described them in detail. One example of a suitable transducer and wiper combination we have used successfully is available from Bournes, Inc., Riverside, California, under the designation "D.C. SN 0773-113". Electric leads 63 from the transducer extend out the upper end of the housing 26 through a fitting 64 to a suitable recorder 65 (shown only schematically in FIG. 5). The recorder likewise is a known item available commercially. One example of a suitable recorder we have used successfully with our apparatus equipped with two gap sensors is available from Soltec Corporation, North Hollywood, California under the designation "B-261-/LA/RC Flat Bed 2-Pen Recorder". We of course use a recorder which has at least as many pens as the number of gap sensors in the apparatus. Alternatively the signals may be fed to a computer for storage and manipulation.

Figure 5:
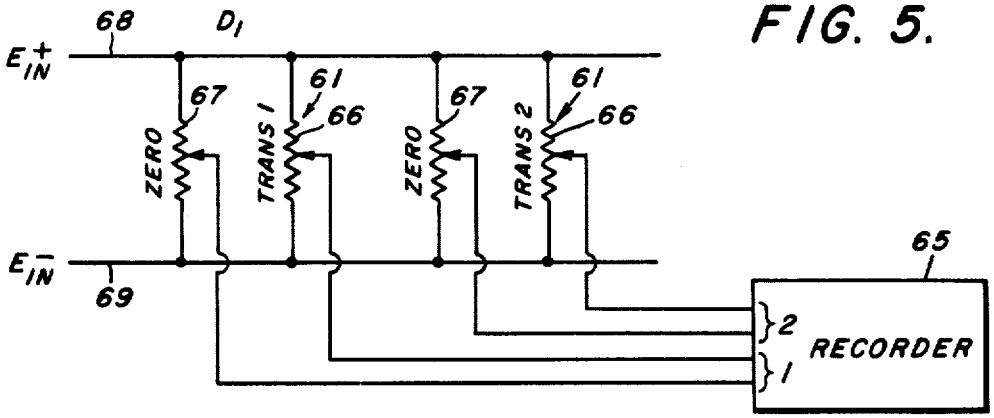
FIG. 5 is a simplified wiring diagram of the gap-measuring circuit embodied in our apparatus.

As shown schematically in FIG. 5, the gap-measuring circuit includes potentiometers 66 embodied in the respective transducers 61, and zero potentiometers 67 for the respective transducers connected in parallel across lines 68 and 69. The various potentiometers are connected to the aforementioned recorder 65, as indicated. We set the zero potentiometers so that the recorder reads "zero" when the heads 50 and 51 of each gap sensor are spaced apart by a predetermined distance relatively close to the proper gap. In the present example we may set the "zero" at 7 inches. The zero setting is needed to bring the recorder into the proper scale. As we use the apparatus to measure gaps, signals transmitted by the transducer potentiometers to the recorder 65 are indicative of differences between the actual gap measurement and the zero setting.

Figure 6:
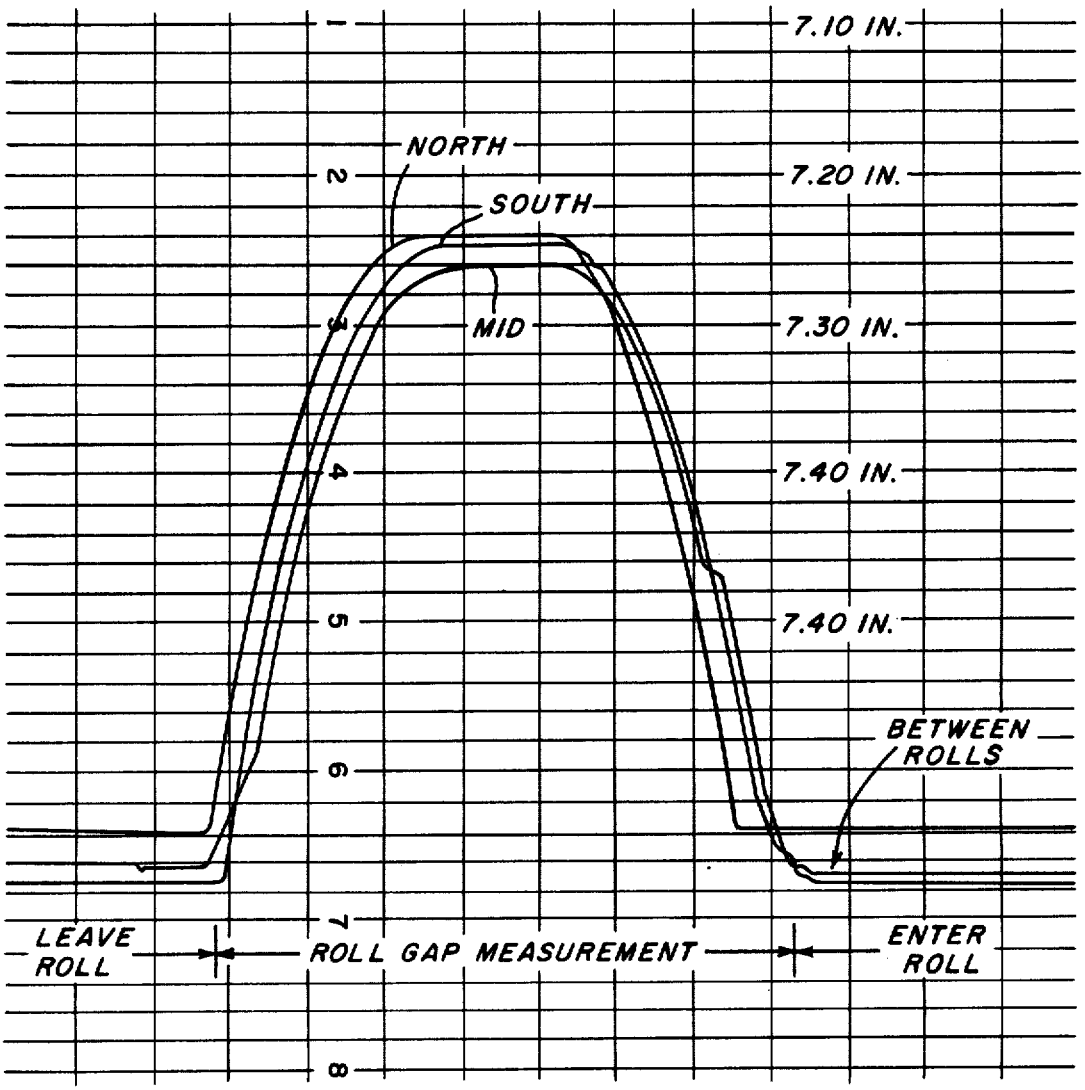
FIG. 6 is an example of a recorded gap measurement obtained with our apparatus.

As we move the apparatus through the path defined by the rolls, the heads 50 and 51 of the gap sensors 48 sucessively contact the work-engaging faces of each roll-pair in turn. As the sensors move beyond each pair of work-engaging faces, the heads move outwardly under the action of springs 58. The voltage signals from the transducers increase in magnitude as the heads move closer together. The signal is minimum while the sensors are out of contact with rolls and maximum when the heads contact the work-engaging faces of the rolls. The maximum signal at each roll pair is representative of the gap. FIG. 6 is representative of the form of recording which results. This is an actual recording obtained with our apparatus equipped with three gap sensors (one in the middle in addition to the two near opposite sides as shown in FIGS. 2 and 3).

ANGLE MEASURMENT

As shown in FIG. 2, the apparatus includes a pair of angle sensors 70 located inside the opposite side walls of the housing 26 midway of the height. Preferably the angle sensors are mounted on separate plates 71 which underlie the respective side walls of the housing and project from the back face of the housing. Springs 72 urge the plates 71 outwardly to the extent permitted by stops 73 (FIG. 4). Thus the plates serve as additional runners which are spring loaded. The angle sensors per se are pendulum devices of a known construction available commercially. One example of a suitable device we have used successfully is available from Humphrey, Inc., San Diego, California, under the designation "CP 49-Precision Pendulum Potentiometric Transducer". We have not shown or described the device in detail, but FIG. 7 illustrates the principle involved. The sensor includes a pendulum 74 and a potentiometer 75 which we connect to lines 76 and 77.

As the housing 26 moves through the roll-rack 14, the roll-engaging edges of the spring-loaded runners 71 always lie at the same angle to the horizontal as a line tangent to the two bottom rolls abutted by these runners. The pendulum 74 always assumes a vertical position. Consequently an angle X between the tangent line and the pendulum is the complement of the angle which the tangent line makes with the horizontal. The pendulum support serves as a wiper for the potentiometer 75, which transmits voltage signals to a digital recorder 78. The circuit includes a zero potentiometer 79, which in this instance we can set to zero. We can calibrate in either direction, but the magnitude of this signal varies directly with the size of the angle X. The digital recorder per se is a known item available commercially. One example of a suitable digital recorder we have used successfully is available from Practical Automation, Inc., Shelton, Connecticut, under the designation "PDM-711 21 19,999 NDC Printing DVM". Since the angle measurements involve very small increments, we require a recorder which affords four-digit resolution or a computer.

We calculate beforehand the size of angle which a line tangent to each pair of adjacent rolls should make with the horizontal. In the present example the work-engaging faces of the rolls lie on arcs of constant radii and each cluster occupies an arc which measures 4°22′50″. If every bottom roll is positioned correctly, the angle which each tangent line makes to the horizontal is greater by a uniform increment than the angle which the next lower tangent line makes with the horizontal. If our apparatus is moved through the curved roll-rack from the lower end up, each successive measurement of the horizontal angle should increase by this amount from 0° to 90°. Exactly halfway up a curved roll-rack of constant radius, the angle should measure 45°. In some curved roll-racks the radii of show arcs on which the work-engaging faces lie vary along continuous-casting length of the rack, but the proper horizontal angle of lines tangent to these faces always can be determined.

FIG. 8 illustrates the geometric principle involved in using the measurement of the angle to determine whether the work-engaging faces of the bottom rolls lie on an arc of the intended radius. The figure is much exaggerated from the actual scale of a curved roll-rack. FIG. 8 shows two successive rolls 80 and 81, the work-engaging faces of which are intended to lie on an arc A of radius R. For simplicity we assume that the line T tangent to the work-engaging faces of these rolls is intended to lie at an angle of 45° to the horizontal, and that the roll 80 already has been positioned properly. If the roll 81 is improperly positioned too close to the center of curvature O, as indicated in dotted lines in FIG. 8, the distance between the center of curvature and its work-engaging face is the shorter radius $R_1$. The resulting tangent line $T_1$ makes a greater angle with the horizontal than the desired tangent line T, and the complement of this angle measures too low, 35° in FIG. 8.

In applying the foregoing principle, we known that the line tangent to two rolls at the exit end of the curved roll-rack should be horizontal. We position these lowermost bottom rolls properly, as with a level. Next we use our apparatus to determine whether the succeeding bottom roll up the rack is positioned properly, and if necessary correct its position by adding or removing shims. In similar fashion we correct the position of each bottom roll up the rack, each time relying on the next lower roll having already been positioned properly. In the example, we determine the angle when the angle sensor reaches a position exactly midway between each two clusters and again when it reaches a position exactly midway of each cluster. If the bottom rolls are positioned properly and the gaps are correct, the top rolls automatically are positioned properly.

LOCATING BENT ROLLS

To locate bent rolls, we move our apparatus first in one direction through the path defined by the rolls and then in the opposite direction. In the continuous-casting machine illustrated, we normally move the apparatus first upwardly and then downwardly. The heads 50 and 51 of the gap sensors 48 can be expected to contact each roll at a different location on its circumference on each pass. Consequently bent rolls are indicated whenever the gap measurements on the downward pass differ from the measurements on the upward pass. If the apparatus has a third gap-sensor at its mid-point a bent roll may be indicated by a significant difference between the gap measurement at mid point and at the ends without need for a second pass.

OPERATION

To summarize the operation of our apparatus, we move the housing 26 along a confined path defined by sets of roll-pairs. If the roll-pairs are in a roll-rack of a continuous-casting machine which employs a flexible starter bar 18, we connect the housing to the upper end of the bar by engaging the hooks 42 with the rung 43 of the bar. In other machines (for example, a continuous-casting machine equipped with a rigid starter bar) we may engage the lifting eyes 45 with a suitable hoisting mechanism and pull the housing up the path. Preferably we move the housing up the path and back down, measuring the gaps and the angles as the housing moves in both directions to locate bent rolls, and also as a check. The measurements recorded on the recorder 65 show the gap at each roll-pair. The angular measurements obtained on the digital recorder 78 shown whether the work-engaging faces of the bottom rolls lie on an arc of the intended radius in the example of a curved roll-rack.

We have illustrated an apparatus which embodies both gap sensors and angle sensors. Nevertheless it is apparent we can employ the same principles in an apparatus which embodies only gap sensors or only angle sensors without the other.

From the foregoing description it is seen that our invention affords a simple advantageous method and apparatus for measuring the gaps between the work-engaging faces of rolls which define a confined path of travel for a workpiece. The invention also facilitates determining whether these faces lie on arcs of the intended radii. Once these determinations have been made, it is of course a simple matter to insert or remove shims and thus position the rolls correctly. If bent rolls are located, they can be replaced.

We claim:

1. An apparatus for locating improperly positioned rolls among a set of rolls which are arranged in opposed pairs and have work-engaging faces defining a confined path of travel for a workpiece, said apparatus comprising a housing movable along said path, means carried by said housing at opposite faces thereof for abutting said work-engaging faces and guiding said housing, and a plurality of gap sensors carried by said housing and including heads supported for relative movement normal to the direction of movement of said housing along said path and adapted to contact the work-engaging faces of the individual roll-pairs successively at a plurality of locations along the length of the rolls, and transducer means operatively connected with said heads for transmitting signals representative of the measurements of the gaps between the work-engaging faces of each roll-pair contacted by said heads.

2. An apparatus as defined in claim 1 in which the means for guiding said housing includes relatively fixed runners projecting from one face of said housing, extensible runners projecting from the opposite face of said housing, and means within said housing urging said extensible runners outwardly with respect to said housing.

3. An apparatus as defined in claim 2 in which said extensible runners are supported in said housing for pivotal and in-and-out movement, and the means urging said extensible runners outwardly includes fluid-pressure cylinders mounted in said housing, means operated by said cylinders bearing against said extensible runners, and spring means connected with said extensible runners holding them in contact with said cylinder operated means.

4. An apparatus as defined in claim 1 in which said housing is movable in two directions along said path, whereby different gap measurements obtained as said housing moves in opposite directions indicate bent rolls.

5. An apparatus as defined in claim 1 comprising in addition angle-measuring means for transmitting signals representative of the angles of lines tangent to the work-engaging faces of adjacent rolls and thereby indicating whether the work-engaging faces lie on an arc of a predetermined radius.

6. An apparatus as defined in claim 5 in which said angle-measuring means includes a pendulum device and transducer means operatively connected with said pendulum device.

7. An apparatus as defined in claim 1 comprising in addition means at one end of said housing for attaching said housing to a starter bar of a continuous-casting machine.

8. An apparatus as defined in claim 7 in which said starter-bar attaching means includes a lock which permits limited freedom of movement of said housing with respect to the starter bar.

9. An apparatus as defined in claim 1 comprising in addition lifting eyes at one end of said housing for attaching a hoisting mechanism to pull the housing along the path defined by the folls.

10. An apparatus for locating improperly positioned rolls in a curbed roll-rack, the rolls of which are arranged in opposed pairs and have work-engaging faces defining a confined path of travel for a workpiece and lying on arcs of predetermined radii, said apparatus comprising a housing movable along said path, at least one gap sensor carried by said housing for transmitting signals representative of the gap measurement between the rolls of the various pairs, and angle-measuring means carried by said housing for transmitting signals representative of the angles of lines tangent to work-engaging faces of adjacent rolls and thereby indicating whether the work-engaging faces lie on arcs of the intended radii.

11. An apparatus as defined in claim 10 comprising a plurality of gap sensors for transmitting signals representative of the gaps between rolls at a plurality of locations along the length of the rolls.

12. An apparatus as defined in claim 10 comprising in addition runners carried by said housing and projecting from opposite faces thereof for abutting the rolls of the opposed pairs and guiding said housing as it moves along said path.

13. An apparatus as defined in claim 12 in which the runners projecting from one face of said housing are fixed relative thereto and the runners projecting from the other face of said housing are extensible, and comprising in addition means within said housing urging said extensible runners outwardly with respect to said housing.

14. An apparatus as defined in claim 10 in which said gap sensor includes heads supported for relative movement normal to the direction of movement of said housing along said path and adapted to contact the work-engaging faces of the individual roll-pairs along said path, and transducer means operatively connected with said heads.

15. An apparatus as defined in claim 10 in which said housing is movable in two directions along said path whereby different gap measurements obtained as said housing moves in opposite directions indicate bent rolls.

16. An apparatus as defined in claim 10 in which said angle-measuring means includes a pendulum device and transducer means operatively connected with said pendulum device.

17. An apparatus as defined in claim 10 comprising in addition means at one end of said housing for attaching said housing to a starter bar of a continuous casting machine.

18. An apparatus for locating improperly positioned rolls in a curved roll-rack in which the rolls are arranged in opposed pairs and have work-engaging faces lying on arcs of predetermined radii, said apparatus comprising a housing movable through the roll-rack, guide means on said housing adapted to abut two adjacent rolls and lie on a line tangent to the work-engaging faces thereof, and angle-measuring means in said housing for indicating the angle at which said guide means lies and thereby indicating whether the work-engaging face of each roll lies on an arc of the intended radius.

19. An apparatus as defined in claim 18 in which said angle-measuring means includes a pendulum device and transducer means operatively connected with said pendulum device for transmitting signals representative of the angle.

20. An apparatus as defined in claim 18 comprising in addition at least one gap sensor mounted in said housing for transmitting signals representative of the measurement of the gaps between the rolls of the various roll-pairs.

21. The combination, with a continuous-casting machine which includes a curved roll-rack, a flexible starter bar, and drive means for propelling said starter bar through said roll rack, of an apparatus attached to said starter bar for locating improperly positioned rolls in said roll rack, said apparatus being constructed as defined in claim 1.

22. A method of locating improperly positioned rolls among a set of rolls which are arranged in opposed pairs and have work-engaging faces defining a confined path of travel for a workpiece, said method comprising moving an apparatus along said path, transmitting signals from said apparatus, representative of the measurement of the gap separating the work-engaging faces of rolls of each pair in succession at a plurality of locations along the length of the rolls during each pass of the apparatus along said path, and recording said signals.

23. A method as defined in claim 22 comprising the further step of moving said apparatus along said path in two directions to obtain signals indicative of bent rolls.

24. A method as defined in claim 22 in which said set of rolls is a curved roll-rack, and said apparatus is attached to a starter bar to be moved along said path.

25. A method of locating improperly positioned rolls among a set of rolls which are arranged in opposed pairs and have work-engaging faces defining a confined path of travel for a workpiece, said method comprising moving an apparatus along said path, transmitting signals from said apparatus representative of the measurement of the gap separating the work-engaging faces of rolls of each pair in succession, transmitting signals representative of the angles of lines tangent to each adjacent pair of work-engaging faces, and recording both the gap-measurement signals and the angle-measurement signals.

26. An apparatus for locating improperly gapped rolls among a set of rolls arranged in opposed pairs and having work-engaging faces with a gap therebetween defining a confined path of travel for a workpiece, said apparatus comprising a supporting structure, means carried by said structure for contacting the work-engaging faces of each pair of rolls at opposite sides of the gap and thereby guiding the structure as it moves along said path, a plurality of gap-sensing means carried by said structure for measuring the gap between each pair of rolls in succession at a plurality of locations along the length of the rolls, and means connected with said gap-sensing means for transmitting signals representative of the measurements.

27. An apparatus as defined in claim 26 comprising in addition means on the lower end of said structure for attaching the apparatus to a starter bar of a continuous-casting machine enabling the apparatus to be propelled with the starter bar through roll-racks of a continuous-casting machine.

*28. A measuring device for measuring the separation distance between conveying rollers in the secondary cooling zone of continuous casting machines comprising transport means adapted to be guided through said cooling zone between said rollers, said transport means having a maximum dimension parallel to said separation distance which is less than said distance and at least one distance detecting means mounted on said transport means for movement therewith, said distance detecting means including at least one probe projecting beyond the limits of said transport means for engagement with a roller, said probe being displaceably supported on said transport means and providing an output signal corresponding in magnitude to the extent of said displacement whereby upon movement of said transport means through said zone, said signal provides an indication of variations in said separation distance along said zone.*

*29. The measuring device of claim 28 wherein said distance detecting means includes two oppositely projecting probes arranged in close proximity to one another, whereby the combined signals from said probes indicates the extent of said separation distance at any given point in said zone.*

*30. The device of claim 28 wherein said distance detecting means is yieldable supported on said transport means to permit bodily retraction where the limit of the tolerable displacement is exceeded.*

*31. The device of claim 28 wherein said distance detecting means includes two oppositely projecting probes arranged coaxially.*

* * * * *